US010819378B2

(12) United States Patent
Jamin et al.

(10) Patent No.: US 10,819,378 B2
(45) Date of Patent: Oct. 27, 2020

(54) TRANSMITTER CIRCUIT FOR RF COMMUNICATION DEVICE, RF COMMUNICATION DEVICE, AND METHOD OF GENERATING AN ANTENNA OUTPUT SIGNAL IN A TRANSMITTER CIRCUIT

(71) Applicant: NXP B.V., Eindhoven (NL)

(72) Inventors: Olivier Jerome Celestin Jamin, Sainte Honorine du Fay (FR); Ludovic Oddoart, Opio (FR)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/553,543

(22) Filed: Aug. 28, 2019

(65) Prior Publication Data

US 2020/0106465 A1 Apr. 2, 2020

(30) Foreign Application Priority Data

Sep. 28, 2018 (EP) ..................................... 18290109

(51) Int. Cl.
*H04B 1/04* (2006.01)
*H04B 1/02* (2006.01)

(52) U.S. Cl.
CPC ....... *H04B 1/04* (2013.01); *H04B 2001/0491* (2013.01)

(58) Field of Classification Search
CPC .......................... H04B 1/04; H04B 2001/0491

(Continued)

(56) References Cited

U.S. PATENT DOCUMENTS 7,274,915 B2 9/2007 Sobel et al.
7,729,445 B2 6/2010 Ravi et al.
(Continued)

FOREIGN PATENT DOCUMENTS

WO WO-02/15387 A2 2/2002
WO WO-02/15387 A3 2/2002

OTHER PUBLICATIONS

Gebjart MSc, Dipl.-Ing. Dr. Michael; "04 Matching Networks"; 4th unit in course 3, RF Basics and Components; RFID Qualification Network, University of Applied Sciences; retrieved from the internet Aug. 26, 2019 www://http://rfid-systems.at/04_Matching_Networks.pdf ;38 pages; (Sep. 30, 2013/14).

(Continued)

*Primary Examiner* — Lee Nguyen
(74) *Attorney, Agent, or Firm* — Charlene R. Jacobsen (57) ABSTRACT

A transmitter circuit includes first and second carrier signal generators for generating corresponding first and second digital carrier signals, each having the same frequency. Modulation circuitry determines a phase shift value based on a received modulation signal. Outphasing circuitry generates a first digital output signal by adding the phase shift value to the phase of the first digital carrier signal and generates a second digital output signal by subtracting the phase shift value from the phase of the second digital carrier signal. A first switched-capacitor digital-to-analog converter (DAC) receives the first digital output signal and generates a first analog antenna output signal. A second switched-capacitor DAC receives the second digital output signal and generates a second analog antenna output signal. The sampling phases of the first and second DACs are opposite one another, whereby the first and second analog antenna output signals form a time-interleaved antenna output signal.

11 Claims, 4 Drawing Sheets

(58) Field of Classification Search
USPC .................................. 455/95; 375/298, 300
See application file for complete search history.

(56) References Cited

U.S. PATENT DOCUMENTS

| | | | |
|---|---|---|---|
| 8,547,177 | B1 | 10/2013 | Yoo et al. |
| 8,928,401 | B2 | 1/2015 | Verlinden et al. |
| 9,172,329 | B2 | 10/2015 | Ciacci et al. |
| 9,520,906 | B2 | 12/2016 | Butterfield et al. |
| 2008/0037662 | A1* | 2/2008 | Ravi ................ H03F 3/217 |
| | | | 375/260 |

OTHER PUBLICATIONS

NXP; "AN11022-CLRC663 Evaluation board quick start guide, Rev 1.5"; Application Note; 42 pages (May 28, 2018).
NXP; "AN11564-PN7120 Antenna Design and Matching Guide Rev 1.1"; Application Note; 63 pages (Apr. 18, 2016).

* cited by examiner

TRANSMITTER CIRCUIT FOR RF COMMUNICATION DEVICE, RF COMMUNICATION DEVICE, AND METHOD OF GENERATING AN ANTENNA OUTPUT SIGNAL IN A TRANSMITTER CIRCUIT

CROSS-REFERENCE TO RELATED APPLICATIONS

This application claims the priority under 35 U.S.C. § 119 of European patent application no. 18290109.0, filed Sep. 28, 2018 the contents of which are incorporated by reference herein.

FIELD OF THE INVENTION

The present invention relates to the field of RF communication devices, in particular to a transmitter circuit for an RF communication device, an RF communication device, and a method of generating an antenna output signal in a transmitter circuit for an RF communication device.

ART BACKGROUND

Known NFC transmitters make use of class-D amplifiers to maximize power efficiency (>70%). Doing so, an EMC filter is strictly required for reducing the amplitude of the carrier harmonics prior to interfacing to the antenna. Linearity is especially crucial when the NFC IC is integrated in a mobile phone, inside which many different radio technologies must cooperate. On top of this, FCC radiation limits shall be met by the NFC system.

Figure 1:
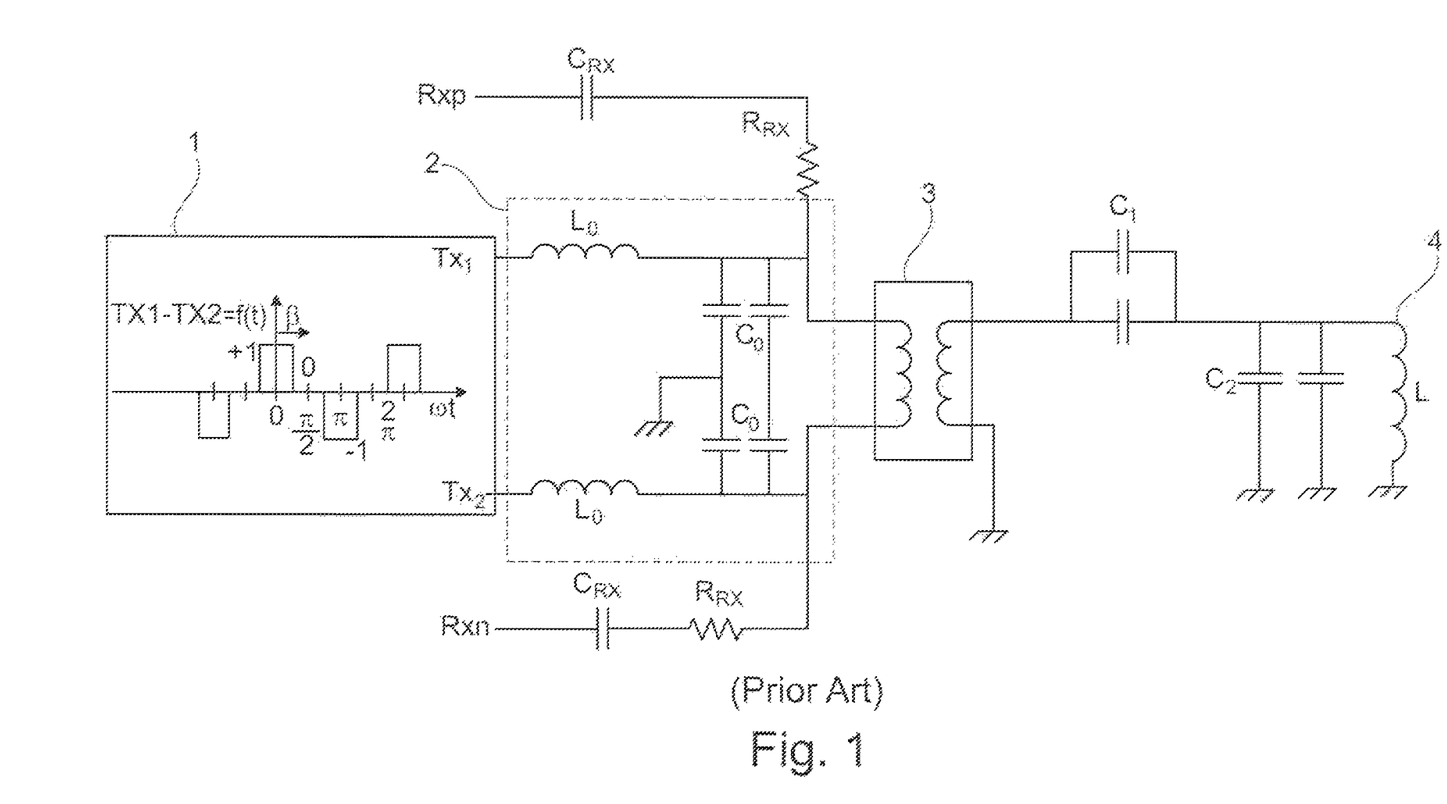
FIG. 1 shows a prior an transmitter to antenna interface.

Even in case of single-ended antennas, current NFC transmitters operate differentially in order to meet power specifications (~1 W). In such a case, as shown in FIG. 1, an additional discrete balun 3 is required between the differential transmitter output and the single-ended antenna.

The discrete EMC filter coil and the balun cause at least the following limitations and disadvantages:

(1) Prohibitive cost (large quality factor is required so the filter inductance and the balun are typically wire-wounded)

(2) Large footprint.

(3) Losses. The coil inductance can have a resistance of ~0.5Ω, which degrades the end-to-end transmitter power efficiency.

(4) Limited current capability. The EMC inductance and the balun have limited current capability (~0.35 A), which limits the current at the transmitter output. In order for a legacy transmitter to reach the demanded antenna power (typically around 1-1.5 W), it needs to operate at a supply voltage of 7V or higher.

There may thus be a need for an RF transmitter without the above drawbacks.

SUMMARY OF THE INVENTION

This need may be met by the subject matter according to the independent claims. Advantageous embodiments of the present invention are set forth in the dependent claims.

According to a first aspect of the invention, there is provided a transmitter circuit for an RF communication device, the transmitter circuit comprising (a) a first carrier signal generator for generating a first digital carrier signal, (b) a second carrier signal generator for generating a second digital carrier signal, the second digital carrier signal having the same frequency as the first digital carrier signal, (c) modulation circuitry adapted to receive an amplitude modulation signal and to determine a phase shift value based on the amplitude modulation signal, (d) outphasing circuitry adapted to generate a first digital output signal by adding the phase shift value to the phase of the first digital carrier signal and to generate a second digital output signal by subtracting the phase shift value from the phase of the second digital carrier signal, (e) a first switched-capacitor digital to analog converter adapted to receive the first digital output signal and generate a corresponding first, analog antenna output signal, and (f) a second switched-capacitor digital to analog converter adapted to receive the second digital output signal and generate a corresponding second analog antenna output signal, wherein (g) the sampling phase of the first switched-capacitor digital to analog converter is opposite to the sampling phase of the second switched-capacitor digital to analog converter, whereby the first analog antenna output signal and the second analog antenna output signal form a time-interleaved antenna output signal.

This aspect is based on the idea that the need for an EMC filter and a balun can be obviated by the use of outphasing and two switched-capacitor (SC) digital to analog converters (DACs). At the same time, a higher power can be provided to an antenna, and the transmitter circuit may operate from low supply voltages, thereby allowing the use of standard dual oxide devices in high integration process nodes (40 nm, 28 nm, 22 nm, and below) and avoiding the need to develop and use custom high-voltage power devices.

The first and second carrier signal generators provide respective first and second digital carrier signals having the same frequency (i.e. the carrier frequency). The modulation circuitry receives an amplitude modulation signal and uses it to determine a phase shift value to be applied to the first and second digital carrier signals (outphasing). This is done by the outphasing circuitry, which adds the phase shift value to the phase of the first digital carrier signal and subtracts the phase shift value from the phase of the second digital carrier signal. The resulting first and second digital output signals are supplied to and received by respective first and second SC DACs which generate first and second analog antenna output signals, respectively, i.e. analog output signals which are to be supplied to an antenna of the RF communication device. The first and second SC DACs are operated with opposite sampling phases. Thereby, the first and second analog antenna output signals combine to form a time-interleaved antenna output signal.

According to an embodiment, the modulation circuitry is adapted to determine die phase shift value by applying an arccosine function to the amplitude modulation signal.

In other words, an arccosine function is used to translate the instantaneous amplitude modulation (or envelope) into an instantaneous phase shift between two signals.

According to a further embodiment, the outphasing circuitry is adapted to add the phase shift value to the first digital carrier signal and subtract the phase shift value from the second digital carrier signal by sampling the first and second digital carrier signal with a respective delay corresponding to the phase shift value.

In this embodiment, the outphasing circuitry samples the first and second digital carrier signals with different delays (e.g. +d and −d) such that a total phase difference of two times the phase shift value occurs between the first and second digital output signals.

According to a further embodiment, the first carrier signal generator and/or the second carrier signal generator comprises a direct digital synthesis signal generator.

Each direct digital synthesis signal generator may preferably comprise a look-up table of carrier signal values corresponding to a plurality of limes within a signal period.

According to a further embodiment, the first carrier signal and the second carrier signal have opposite phases, the first switched-capacitor digital to analog converter is coupled to supply the first analog antenna output signal to one antenna terminal, and the second switched-capacitor digital to analog converter is coupled to supply the second analog antenna output signal to another antenna terminal.

In other words, the first analog antenna output signal and second analog antenna output signal are respectively supplied to different antenna terminals, i.e. in a differential manner.

In some embodiments the phases may not be exactly opposite, e.g. due to parasitic capacitances. This may be compensated by appropriate calibration.

According to a further embodiment, the first carrier signal and the second carrier signal have identical phases, die first switched-capacitor digital to analog converter is coupled to supply the first analog antenna output signal to a common antenna terminal, and the second switched-capacitor digital to analog converter is coupled to supply the second analog antenna output signal to the common antenna terminal.

In other words, both the first analog antenna output signal and the second analog antenna output signal are supplied to a common antenna terminal, i.e. in a single-ended manner.

In some embodiments the phases may not be exactly identical, e.g. due to parasitic capacitances. This may be compensated by appropriate calibration.

According to a second aspect, there is provided an RF communication device, comprising (a) a transmitter circuit according to the first aspect or any of the above embodiments, and (b) an antenna coupled to receive the first analog antenna output signal and the second analog antenna output signal.

This aspect is based on the same idea as the first aspect. More specifically, the second aspect provides an RF communication device with the benefits and advantages provided by the transmitter circuit of the first aspect.

According to an embodiment, the RF communication device further comprises a receiver circuit coupled to the antenna.

According to a further embodiment, the RF communication device further comprises a first calibration unit adapted to calibrate the first and second carrier signal generators based on a signal from the receiver.

Preferably, the first calibration unit may operate to minimize the amplitude of specific harmonics or minimize an RMS error between the ideal carrier signal and the carrier signal received from the receiver, i.e. the carrier signal respectively output by the first and second carrier signal generators and received by the receiver.

According to a further embodiment, the RF communication device further comprises a second calibration unit adapted to calibrate the outphasing circuitry bused on a signal received from the receiver.

The second calibration unit, may preferably operate to detect and compensate for delay differences between the part of the outphasing circuitry that generates the first digital output signal and the part of the outphasing circuitry that generates the second digital output signal. This may preferably involve measurements of modulated and unmodulated output signals for a series of modulation index values (i.e. specific modulation signal values), calculation of corresponding modulation index error, and determination of delay correction to be applied to the two paths in order to obtain the correct modulation index.

According to a third aspect, there is provided a method of generating an antenna output signal in a transmitter circuit for an RF communication device, the method comprising (a) generating a first digital carrier signal (b) generating a second digital carrier signal, the second digital carrier signal having the same frequency as the first digital carrier signal, (c) receiving an amplitude modulation signal, (d) determining a phase shift value based on the received amplitude modulation signal, (e) generating a first digital output signal by adding the determined phase shift value to the phase of the first digital carrier signal, (f) generating a second digital output signal by subtracting the determined phase shift value from the phase of the second digital carrier signal, (g) receiving the first digital output signal at a first switched-capacitor digital to analog converter and generating a corresponding first analog antenna output signal, and (h) receiving the second digital output signal at a second switched-capacitor digital to analog converter and generating a corresponding second analog antenna output signal, wherein (i) the sampling phase of the first switched-capacitor digital to analog converter is opposite to the sampling phase of the second switched-capacitor digital to analog converter, whereby the first analog antenna output signal and the second analog antenna output signal form a time-interleaved antenna output signal.

This aspect is based on the same idea as the first aspect described above.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

The illustration in the drawing is schematic. It is noted that in different figures, similar or identical elements are provided with the same reference signs or with reference signs, which differ only within the first digit.

FIG. 1 shows a prior art transmitter to antenna interface. More specifically, FIG. 1 shows a class-D amplifier 1 with outputs TX1 and TX2, an FMC filter 2, balun 3, and antenna 4. As discussed in the background section above, the (liter 2 and balun 3 have several limitations and disadvantages, which are overcome by the present invention as described in the following.

Figure 2:
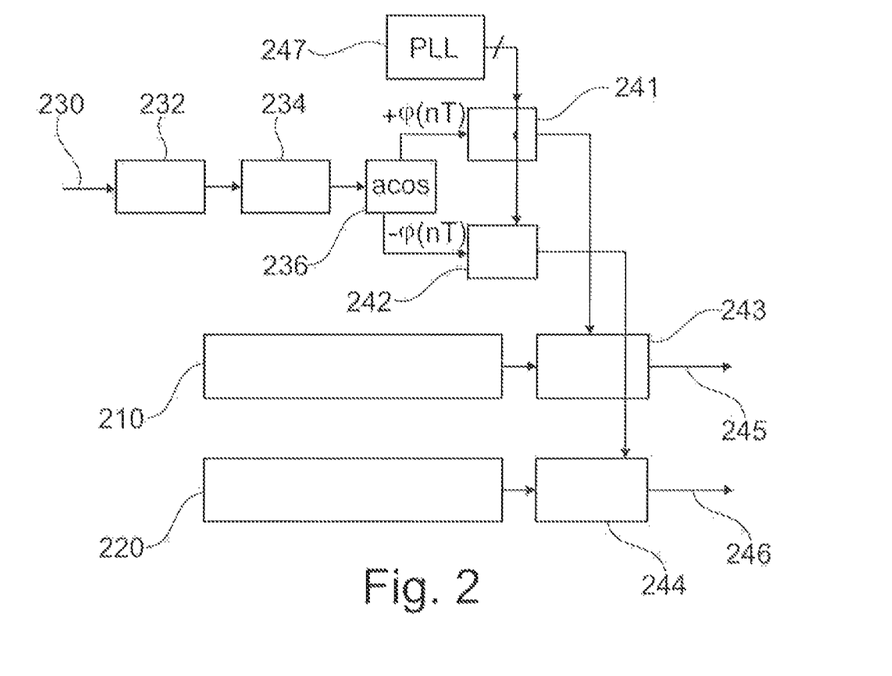
FIG. 2 shows a block diagram of a transmitter circuit (digital part) in accordance with an embodiment.

FIG. 2 shows a block diagram of a digital part of a transmitter circuit in accordance with an embodiment. More specifically, FIG. 2 shows a first carrier signal generator 210 for generating a first digital carrier signal and a second carrier signal generator 220 for generating a second digital carrier signal having the same frequency as the first digital carrier signal. The first and second carrier signal generators 210, 220 may be implemented as digital direct synthesis (DOS) signal generators. FIG. 2 further shows modulation circuitry comprising a modulation envelope generator 232 receiving a modulation signal 230, an envelope shaping unit 234, and a phase shift calculation unit 236 adapted to determine a phase shift value $\varphi$ based on the amplitude modulation signal. FIG. 2 also shows outphasing circuitry comprising a first multiplexer 241, a second multiplexer 242, a first re-sampling unit 243, a second re-sampling unit 244, and a PLL circuit 247. The PLL circuit 247 provides a plurality of different phases (e.g. 16 different phases) of a clock signal having a frequency that is an integer multiple of the carrier frequency (e.g. $24*f_C$, such as 325.44 MHz=24*13.56 MHz). These phases are supplied to the first and second multiplexers 241, 242, which then, in dependency of the determined phase shift value $\varphi$ selects the appropriate phases as trigger signals for the first and second re-sampling units 243, 244. Thereby, the first re-sampling unit 243 generates a first digital output signal 245 with a phase difference relative to the first digital carrier signal equal to $+\varphi$ while the second re-sampling unit 244 generates a second digital output signal 246 with a phase difference relative to the second digital carrier signal equal to $-\varphi$. In total, the phase difference between the first and second digital output signals 245, 246 thus amounts to $2*\varphi$.

Figure 3:
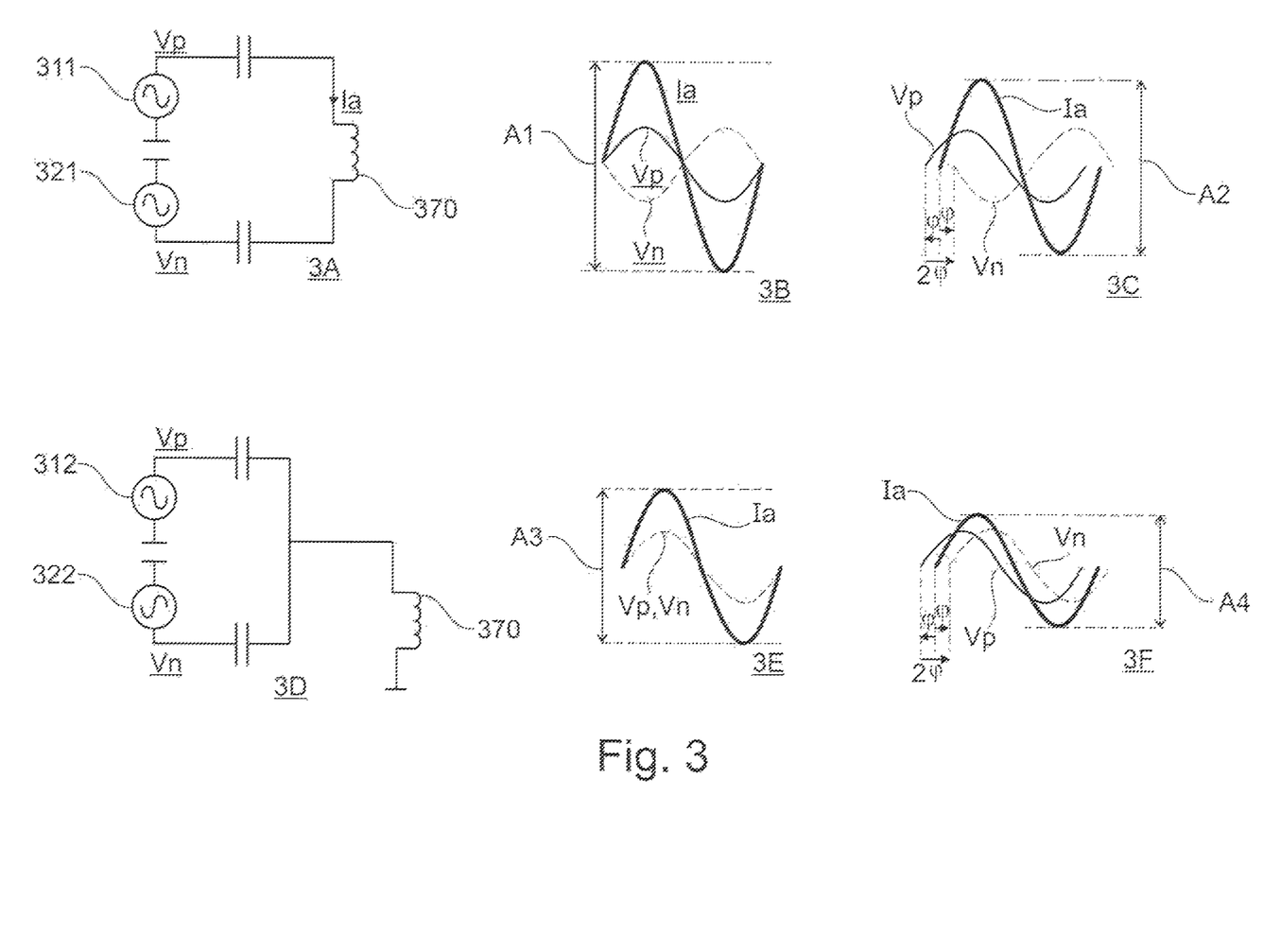
FIG. 3 shows the function of outphasing circuitry in accordance with embodiments.

FIG. 3 shows the functional principle of the outphasing circuitry shown in FIG. 2 and discussed above. More specifically, the upper part of FIG. 3 (i.e. the figures labeled 3A, 3B and 3C), illustrates the function in a differential antenna configuration and the lower part of FIG. 3 (i.e., the figures labeled 3D, 3E and 3F) illustrates the function in a single ended antenna configuration.

As shown in FIG. 3A, a first signal generator 311 provides a first sinusoidal voltage Vp to one terminal of antenna 370 and a second signal generator 321 provides a second sinusoidal voltage Vn to the other terminal of antenna 370. If, as shown in FIG. 3B, the voltages Vp and Vn are exactly 180° out of phase (i.e., in counter-phase), the resulting antenna current Ia will have a maximum amplitude of A1. If, as shown in FIG. 3C, a phase shill of $\varphi$ is added to the phase of Vp and subtracted from the phase of Vn, the resulting antenna current Ia will have an amplitude of A2, which is smaller than A1. More specifically, $A2=A1*\cos(\varphi)$.

Similarly, FIG. 3D shows a first signal generator 312 that prov ides a first sinusoidal voltage Vp to one terminal of antenna 370 and a second signal generator 322 that provides a second sinusoidal voltage Vn to the same terminal of antenna 370. In this single-ended configuration, the other terminal of the antenna is connected to ground. If, as shown in FIG. 3E, the voltages Vp and Vn are in phase, the resulting antenna current Ia will have a maximum amplitude of A3. If, as shown in FIG. 3F, a phase shift of $\varphi$ is added to the phase of Vp and subtracted from the phase of Vn, the resulting antenna current Ia will have an amplitude of A4, which is smaller than A3. More specifically, $A4=A3*\cos(\varphi)$.

Figure 4:
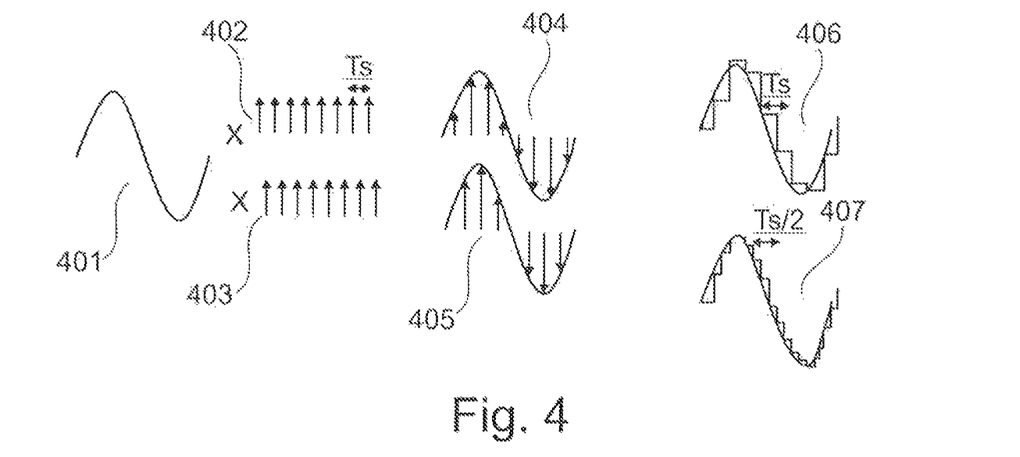
FIG. 4 illustrates time-interleaved antenna output signals in accordance with an embodiment.
Figure 5:
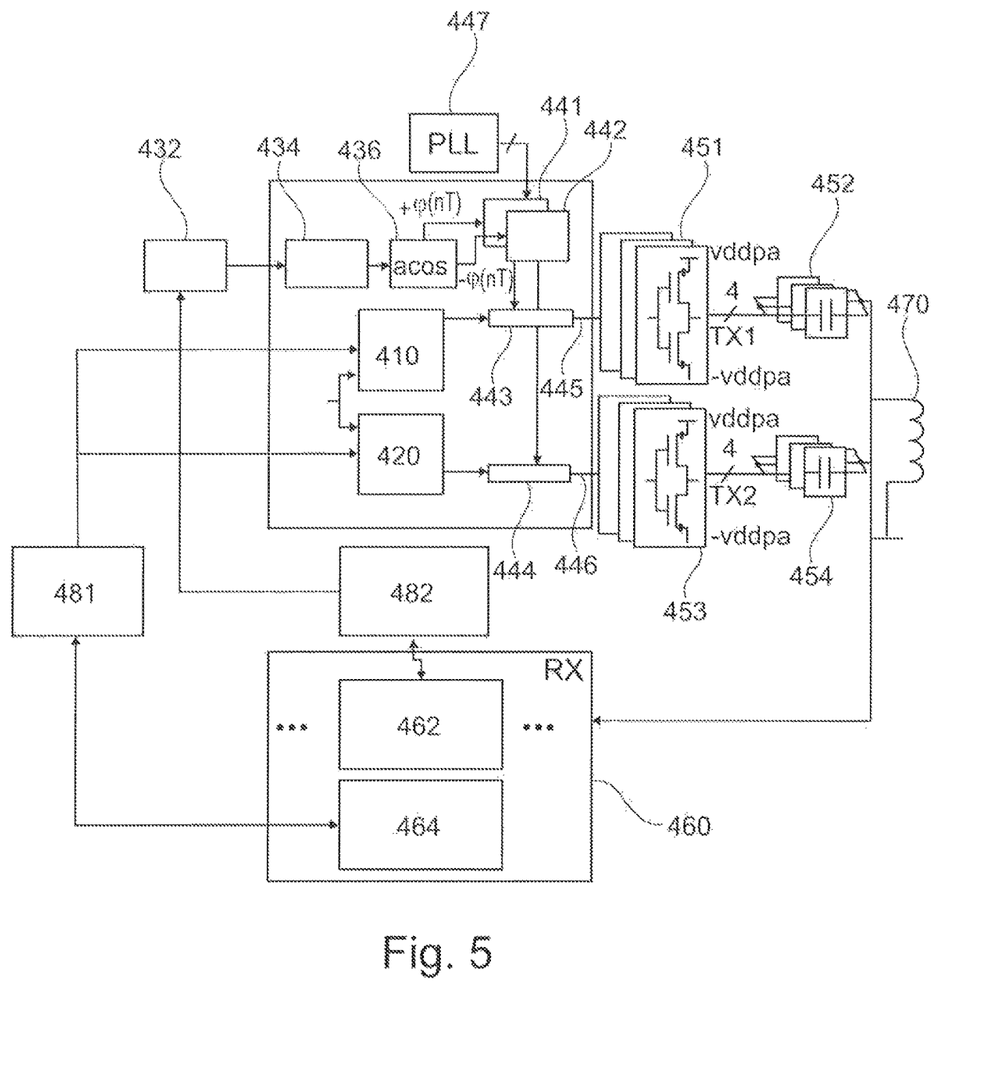
FIG. 5 shows an RF communication device in accordance with an embodiment.

FIG. 4 illustrates the concept of time-interleaved antenna output signals as implemented in embodiments. More specifically, FIG. 4 shows a sinusoidal waveform 401, a first sequence of sampling signals 402, and a second sequence of sampling signals 403. The lime interval Ts between the sampling signals is identical in both sequences 402, 403, but there is a phase difference of 180° such that the signals in one sequence occur in the middle between two signals in the other sequence. The sampling of waveform 401 with the first sequence 402 is shown at 404 and the sampling of waveform 401 with the second sequence 403 is shown at 405. The digital signal 406 corresponding to 404 has the sampling interval Ts, whereas the combination of the digital signals resulting from 404 and 405 has a sampling interval equal to Ts/2. Thus, by sampling the output signals 245 and 246 (in FIG. 2) with digital to analog converters which are operated in counter phase, an apparent sampling frequency of double the actual sample frequency results, FIG. 5 shows an RF communication device in accordance with an embodiment. The RF communication device includes the transmitter circuit of FIG. 2, a first switched-capacitor digital to analog converter (SC DAC) with integrated drivers 451 and external capacitors 452, a second switched-capacitor digital to analog converter with integrated drivers 453 and external capacitors 454, a receiver 460 with modulation index detector 462 and amplitude detector 464, an antenna 470 (in single-ended configuration), a first calibration unit 481 for calibrating the first and second carrier signal generators 410, 420, and a second calibration unit 482 for calibrating the outphasing circuitry. It is noted that the antenna 470 may also be arranged in a differential configuration as shown in FIG. 3A.

The components and functions of the transmitter circuit are described in conjunction with FIG. 2. The first and second SD DACs 451, 452; 453, 454 operate in counter phase to provide lime interleaving as described above in conjunction with FIG. 4.

The first calibration unit 481 is coupled to communicate with the amplitude detector 464 of the receiver 460 and with each of the first and second carrier signal generators 410, 420. The first calibration unit 481 is configured to optimize the linearity of the carrier signals. This is done by repeating the following all across the sine wave shape:

(A) Measure $\Delta\{code(n)-code(n-1-k)\}$ by playing the two codes at a frequency close to the center of the antenna system bandwidth (e.g. 13.56 MHz). A value of $k \neq 0$ is only required if the receiver 460 is not sensitive enough to accurately measure 1 DAC LSB. Receiver settings shall be kept constant during the full measurement.

(B) Deduce an absolute table from all relative measurements; DAC output amplitude=f(DAC code).

(C) Find the best code sequencing to minimize an error function. A high complexity algorithm may do this by minimizing the amplitude of specific harmonics or by minimizing an RMS error between the ideal carrier signal and the synthesized carrier signal. Alternatively, an algorithm with lower complexity may involve normalizing the amplitudes (to ideal sine wave amplitudes): selecting, for each targeted carrier signal phase, the DAC code amplitude which is the closest; repeating for a few normalization gains; and selecting the best configuration.

The maximum modulation index which the outphasing circuitry can synthesize is limited by the phase matching between the two transmitter paths, i.e. differences in delay between inverters and capacitors in the two transmitter paths, and differences in delay in the chip between the inverter gate signals. The second calibration unit 482 is coupled to communicate with the receiver 460 and with the modulation envelope generator 432. The second calibration unit 482 is configured to optimize the outphasing delays using a finite state machine (FSM), which schedules the calibration process as follows: Several modulation indexes are synthesized on-demand by the envelope generator 432. For each of them, the receiver 460 processes both the unmodulated signal and the modulated signal. The receiver 460 calculates the measured modulation index. The FSM engine calculates the modulation index error and calculates the delay correction to apply between the two transmitter paths in order to get the desired modulation index. This calibration technique can be applied (i) during testing with automatic test equipment (ATE), referred to as ATE trim, (it) during customer application development, referred to as customer trim, and (iii) in real-time during operation.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A transmitter circuit for an RF communication device, the transmitter circuit comprising
   a first carrier signal generator for generating a first digital carrier signal,
   a second carrier signal generator for generating a second digital carrier signal, the second digital carrier signal having the same frequency as the first digital carrier signal,
   modulation circuitry adapted to receive an amplitude modulation signal and to determine a phase shift value ($\varphi$) based on the amplitude modulation signal,
   outphasing circuitry adapted to generate a first digital output signal by adding the phase shift value to the phase of the first digital carrier signal and to generate a second digital output signal by subtracting the phase shift value from the phase of the second digital carrier signal,
   a first switched-capacitor digital to analog converter adapted to receive the first digital output signal and generate a corresponding first analog antenna output signal, and
   a second switched-capacitor digital to analog converter adapted to receive the second digital output signal and generate a corresponding second analog antenna output signal,
   wherein the sampling phase of the first switched-capacitor digital to analog converter is opposite to the sampling phase of the second switched-capacitor digital to analog converter, whereby the first analog antenna output signal and the second analog antenna output signal form a time-interleaved antenna output signal.

2. The transmitter circuit according to claim 1, wherein the modulation circuitry is adapted to determine the phase shift value by applying an arccosine function to the amplitude modulation signal.

3. The transmitter circuit according to claim 1, wherein the outphasing circuitry is adapted to add the phase shift value to the first digital carrier signal and subtract the phase shift value from the second digital carrier signal by sampling the first and second digital carrier signal with a respective delay corresponding to the phase shift value.

4. The transmitter circuit according to claim 1, wherein the first carrier signal generator and/or the second carrier signal generator comprises a direct digital synthesis signal generator.

5. The transmitter circuit according to claim 1, wherein the first carrier signal and the second carrier signal have opposite phases, wherein the first switched-capacitor digital to analog converter is coupled to supply the first analog antenna output signal to one antenna terminal, and wherein the second switched-capacitor digital to analog converter is coupled to supply the second analog antenna output signal to another antenna terminal.

6. The transmitter circuit according to claim 1, wherein the first carrier signal and the second carrier signal have identical phases, wherein the first switched-capacitor digital to analog converter is coupled to supply the first analog antenna output signal to a common antenna terminal, and wherein the second switched-capacitor digital to analog converter is coupled to supply the second analog antenna output signal to the common antenna terminal.

7. An RF communication device, comprising
   a transmitter circuit according to claim 1, and
   an antenna coupled to receive the first analog antenna output signal and the second analog antenna output signal.

8. The RF communication device according to claim 1, further comprising
   a receiver circuit coupled to the antenna.

9. The RF communication device according to claim 8, further comprising
   a first calibration unit adapted to calibrate the first and second carrier signal generators based on a signal from the receiver.

10. The RF communication device according to claim 8, further comprising
    a second calibration unit adapted to calibrate the outphasing circuitry based on a signal received from the receiver.

11. A method of generating an antenna output signal in a transmitter circuit for an RF communication device, the method comprising
    generating a first digital carrier signal,
    generating a second digital carrier signal, the second digital carrier signal having the same frequency as the first digital carrier signal,
    receiving an amplitude modulation signal,
    determining a phase shift value based on the received amplitude modulation signal,
    generating a first digital output signal by adding the determined phase shift value to the phase of the first digital carrier signal,
    generating a second digital output signal by subtracting the determined phase shift value from the phase of the second digital carrier signal,
    receiving the first digital output signal at a first switched-capacitor digital to analog converter and generating a corresponding first analog antenna output signal, and
    receiving the second digital output signal at a second switched-capacitor digital to analog converter and generating a corresponding second analog antenna output signal,
    wherein the sampling phase of the first switched-capacitor digital to analog converter is opposite to the sampling phase of the second switched-capacitor digital to analog converter, whereby the first analog antenna output signal and the second analog antenna output signal form a time-interleaved antenna output signal.

* * * * *